Aug. 4, 1936.  W. GILBERT, SR  2,049,955
SHAFT SEAL
Filed July 25, 1935
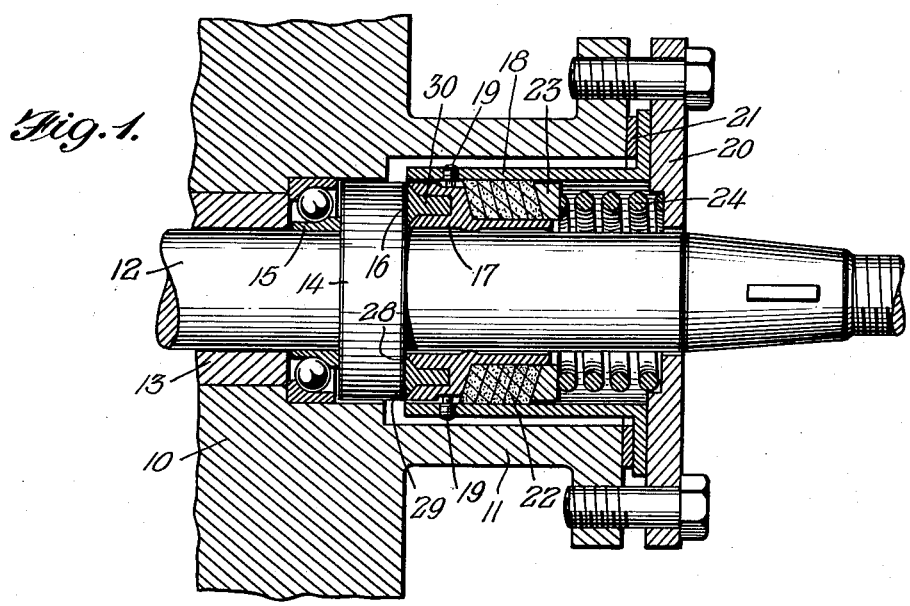
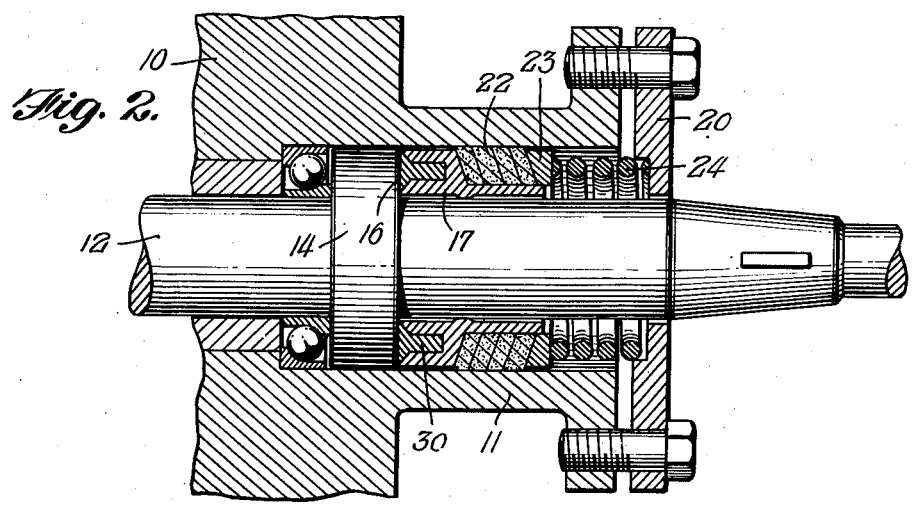

Patented Aug. 4, 1936

2,049,955

UNITED STATES PATENT OFFICE 2,049,955

SHAFT SEAL

Walter Gilbert, Sr., Johnstown, Pa.

Application July 25, 1935, Serial No. 33,143

2 Claims. (Cl. 286—7)

This invention relates to packings for sealing rotating shafts and the like in pumps, refrigeration compressors, turbines, engines, drilling machines, ship propulsion, etcetera, against leakage.

In packings used in compressors and the like, metal sealing rings are preferable to withstand the wear and temperature occasioned by the rubbing speeds and pressures encountered, although in a comparatively short time such metal sealing rings score the sealing abutment on the shaft or housing, even where the sealing ring is of comparatively soft metal. This scoring is believed to be the result of the formation of abrasive particles from the lubricant employed, such particles apparently becoming embedded in the softer metal at the seal and thereby forming cutting points of graphite or the like which scratch the opposite sealing surface.

Heretofore attempts have been made to minimize this scoring by reducing the rubbing area of the sealing ring to a minimum but this expedient is entirely ineffective because of the resultant increase in the pressure between the rubbing surfaces which enhances the scoring at the point of contact.

It is an object of the invention to provide a packing adapted to operate efficiently without adjustment for long periods of time.

A further object of the invention is to provide a packing in which the sealing pressure is not affected by changes in pressure of the confined fluid; which is adapted to obviate scoring of the surfaces at the seal; and which is capable of prolonged operation without external lubrication if desired.

A further object of the invention is to provide a simple packing that may be used to replace packings in use for example in refrigerant compressors without modification or alteration of the parts of the compressor.

In accordance with the invention the scoring of the rubbing surfaces is avoided by providing the sealing ring with tapered edges whereby the wear that takes place in service continually varies the area of contact and redistributes the load or rubbing surface. It is found that this small change in the sealing surface of the sealing ring minimizes scoring to a surprising extent so that seal remains effective for a much longer period of time and the life of the packing is greatly increased.

In accordance with a further feature of the invention the face of the sealing ring is provided with a recess which is filled with a lubricating compound such as graphite confined by the edges of the recess so that the lubricant assumes a part of the sealing pressure and diminishes the wear on the sealing ring. The provision of the recess containing lubricant has the further advantage that if the sealing ring or packing surfaces are not lubricated properly, the relatively soft lubricant provides sufficient lubrication so that the packing will not be damaged if operated for extended periods of time without such external lubrication although wear may be increased and the life of the ring shortened. The lubricating compound may consist for example of graphite with a suitable binder of a conventional character or which is not affected by the refrigerant.

Other objects and advantages of the invention will appear from the following description of the embodiments thereof shown in the accompanying drawing, wherein Fig. 1 is a longitudinal sectional view of the packing in a refrigerant compressor, and Fig. 2 is a similar view showing a modification.

Referring to Fig. 1, the invention is illustrated as applied to a refrigerant compressor since the packing of the drive shaft of such compressors is an important field of application of the invention and illustrates the structural features thereof, although it is to be understood that the packing may be applied to various other machines or structures having rotating or oscillating shafts. In Fig. 1 the wall 10 of the compressor is provided with an integral extension 11 surrounding the rotating shaft 12 adjacent the bearing 13. The drive shaft 12 is provided with an abutment 14 which may be made integral with the shaft or secured thereto in any desired manner. The abutment 14 is arranged in cooperative relation to the thrust bearing 15 and one side 16 of said abutment is finished to provide a sealing surface for cooperation with the sealing ring 17. The general character and arrangement of the sealing surfaces illustrates a typical construction which may be altered in any desired manner.

In the embodiment shown the sealing ring 17 is stationary, said ring being secured to housing sleeve 18 by means of set screws 19, or the like. The housing sleeve 18 is secured to the extension 11, as for example by being clamped between the outer end of said extension and a retaining plate or cap member 20 bolted to said extension.

A gasket 21 is interposed between the sleeve 18 and the extension 11 to seal the casing of the compressor at this point.

A packing gland 22 is interposed between the sealing ring 17 and the housing sleeve 18 in order to seal the casing against the escape of fluid around the outside of the sealing ring 17. In the embodiment shown the gland 22 is placed under compression by a follower ring 23 and spring 24, abutting against the retainer plate 20. Any other suitable sealing means may be employed between the exterior of the sealing ring 17 and the housing sleeve 18 or extension 11, such seal presenting no difficulty by reason of the fact that there is only slight relative movement between these parts. In some cases, however, the outer end of the shaft 12 becomes bent or is distorted by the tension upon the driving belt so that it is necessary to employ a yielding packing as indicated at 22 of such character as to permit a slight deflection of the shaft 12 and the sealing ring 17 which is carried by the shaft with respect to the opposite sealing surface which is rigid with the casing of the compressor. In the construction shown there is a slight clearance between the periphery of the sealing ring 17 and the inner surface of the housing sleeve 18 permitting deflection of the shaft 12 without affecting the seal.

In accordance with the primary feature of the invention, the sealing surface of the sealing ring 17 is provided with a recess having the tapered end surfaces 28, 29 providing substantially sharp pointed edges for engagement with the sealing surface 16 of the abutment 14. With this construction it is found that as the sealing surface of the relatively soft sealing ring 17 wears, the area of contact between the ring 17 and the abutment 14 changes and scoring of the abutment 14 is obviated. The recess in the ring 17 may be filled with a soft non-liquid lubricant material such as graphite or graphitic compound which is so confined by the edges of the sealing ring which are in high-pressure engagement with the abutment 14 that the lubricant assumes a part of the pressure between the sealing surfaces.

It will be further noted that the sealing pressure is determined by the tension of the spring 24 and is not affected by variations in the pressure of the confined fluid in the casing of the compressor whether such pressures be above or below atmospheric pressure. In some instances the pressures may vary in a single machine between a pressure below atmospheric pressure and pressures substantially above that value depending upon whether the machine is shut down or is operating, and it is of substantial advantage to have a seal which is not affected by such variation in pressure as in that case the sealing pressure may be chosen merely sufficient to affect a tight seal and thus avoid the rapid wear and heat resulting from excessive sealing pressures.

The detailed construction shown and described for purposes of illustration may be variously modified without departing from the scope of the invention. Thus, as shown in Fig. 2, the housing sleeve 18 may be eliminated and the gland 22 on the sealing ring 17 arranged to bear directly upon the inner surface of the extension 11. In this case the gland 22 seals the compressor against leakage along the outside of the sealing ring 17 whereas the ring 17 provides a seal against leakage along the surface of the shaft 12. Obviously the form of the shaft abutment and size of the sealing ring 17 may be altered in various ways depending upon the type of seal and arrangement of the opposing sealing members. Also the packing gland 22 and the spring means for compressing said gland and for holding the sealing ring 17 in sealing engagement may be modified as the general arrangement shown is conventional or may be constructed in a conventional manner. Consequently these changes are deemed to come within the scope of the appended claims.

I claim:—

1. In combination with an apertured housing and a shaft passed through the housing and having an abutment collar thereon, a sealing assembly comprising a sealing ring encircling said shaft and having an extremity presented to one side of said collar substantially corresponding to the height of the collar and provided with an annular groove having tapered sides providing thin annular engagement with the side of the collar, a soft solid lubricant in said recess filling the space between the tapered sides presenting a solid lubricated wall surface abutting the collar for sealing contact therewith, means providing a seal between the sealing ring and said housing, and means tending to resiliently urge the ring against the collar.

2. In combination with an apertured housing and a shaft passed through the housing and having an abutment collar thereon, a sealing assembly comprising a sealing ring encircling said shaft and having a radially enlarged extremity presented to one side of said collar substantially corresponding to the height of the collar and formed with an annular groove opening out toward the collar in tapered side walls providing substantially sharp edges for engagement with the side of the collar, a soft solid lubricant such as graphite or the like in said recess filling the space between the tapered side walls and presenting a substantially solid lubricated wall surface abutting the collar for sealing contact therewith, means providing a seal between the sealing ring and said housing, and means tending to resiliently urge the ring against the collar.

WALTER GILBERT, Sr.